US005434337A

United States Patent [19]

Kiss

[11] Patent Number: 5,434,337

[45] Date of Patent: Jul. 18, 1995

[54] PROCESS FOR DESTROYING TOXIC SUBSTANCES OCCURRING DURING THE ELIMINATION OF ORGANIC REFUSE COMPONENTS

[75] Inventor: Günter H. Kiss, Monaco, Monaco

[73] Assignee: Thermoselect AG, Vaduz, Liechtenstein

[21] Appl. No.: 42,593

[22] Filed: Apr. 2, 1993

[30] Foreign Application Priority Data

Apr. 6, 1992 [DE] Germany ........................ 42 11 513.2

[51] Int. Cl.[6] ........................... A62D 3/00; B09B 3/00

[52] U.S. Cl. .................................... 588/205; 588/206; 588/209; 588/228; 588/248

[58] Field of Search ...................... 423/245.3; 588/228, 588/209, 205, 206, 248

[56] References Cited

U.S. PATENT DOCUMENTS

| | | | |
|---|---|---|---|
| 3,884,162 | 5/1975 | Schuster | 110/8 R |
| 4,018,879 | 4/1977 | Winnen | 423/481 |
| 4,715,965 | 12/1987 | Sigerson et al. | 210/800 |
| 5,061,463 | 10/1991 | Vickery | 423/210 |

FOREIGN PATENT DOCUMENTS

| | | | |
|---|---|---|---|
| 3900268 | 8/1989 | Germany | 588/209 |

*Primary Examiner*—Gary P. Straub
*Assistant Examiner*—Timothy C. Vanoy
*Attorney, Agent, or Firm*—Marshall & Melhorn

[57] ABSTRACT

A process for destroying toxic substances is described by irreversible substance decomposition of chemically relatively stable molecular structures occurring during the heat treatment of organic refuse constituents and whilst using a high temperature reactor. For this purpose, the reactor burner zone is supplied with a toxic substance—molecular structure mixture mixed with additional combustible gases raising the flame temperature and which is in liquid and/or gaseous form, in addition to oxygen in stoichiometric excess. The reaction gas thermally split off in the oxygen burner is then kept for at least 5 seconds in a stabilizing area of the reactor kept at a temperature of at least 1400° C. and subsequently is suddenly cooled from this temperature to at least 100° C.

3 Claims, No Drawings

PROCESS FOR DESTROYING TOXIC SUBSTANCES OCCURRING DURING THE ELIMINATION OF ORGANIC REFUSE COMPONENTS

BACKGROUND OF THE INVENTION

1. Field of the Invention

The invention relates to a process for the elimination of toxic substances by irreversible substance decomposition and to an apparatus for performing this process, particularly a burner tip or head specially constructed for this purpose.

2. Summary of the Related Art

In a known process for converting waste materials, which contain thermally decomposable, chemical substances, into end products such as $CO_2$, CO, $H_2O$, etc., the waste substances are exposed to a hot plasma gas, in such a way that in the reaction zone an oxygen potential is maintained such that the decomposition products can be continuously converted into the aforementioned end products. The waste materials are passed through a reaction zone heated to at least 2000° C. and which is constituted by a groove or channel in a gas-permeable, lumpy charge of a reactor chamber, namely a charge formed from at least partly carbon-containing material. The period of time duping which the reactants remain in the reaction zone in the known process, is only a few milliseconds, whereas the period of time during which the charge materials remain in the residual charge of the reactor chamber is between 1 and 5 seconds. If the waste materials are in the gaseous state, they are partly or completely mixed with the plasma gas and are otherwise brought into the reactor reaction zone in solid form or in the form of a liquid by means of a carrier gas. In this known process the reactor chamber is located in a conventional coke furnace shaft, in which, by means of a blast furnace throat, lumpy, carbon-containing material is supplied in the form of coke or the like. It must be ensured that within the complete reactor chamber there is a substantially constant gas upcurrent for the lower burner gases, so as to be able to ensure uniform thermal conditions for the complete reaction processes. The waste materials to be destroyed are fed into the reactor chamber by means of supply presses over its floor and there are temperatures of approximately 1370° C. in a preheating zone. The waste materials are subsequently passed through a reaction zone heated to at least 2000° C., the plasma arc being directed onto the carbon-containing, gas-permeable reactor chamber charge.

SUMMARY OF THE INVENTION

In this known process advantageous thermodynamic conditions with respect to the reaction zone and the gas-permeable, lumpy filling as the residence and stabilization zone positioned above the same are created, but it is disadvantageous that for this purpose a coke furnace is required, which must be operated with coke, dolomite, pit coal or the like. Although the plasma gas is admittedly mixed together with the waste materials and/or their decomposition products in gaseous or liquid form in a supply chamber and accompanied by strong turbulence, it subsequently passes out of a burner nozzle, where it is not ensured that all the toxic substances are exposed to the high plasma temperatures of above 2000° C.

The problem of the invention is to provide a process based on this prior art and which without any additional need for extraneous carbon carriers permits a thermal toxic substance waste elimination and in which in the presence of an excess oxygen quantity the toxic substances occurring are converted into stable combustion products in such a way that there is no prejudice to the environment and the process is performed economically.

According to the invention this problem is solved by the process given in the claim.

DESCRIPTION OF THE PREFERRED EMBODIMENT

Due to the fact that the stabilizing area in the high temperature reactor above the burning zone is provided by the carbon-containing residual constituents of the thermally suitably prepared refuse and only by the latter, the constituents being in lumpy or fragmentary, gas-permeable form, in the case of a continuous infeed into the reactor there is no need for any carbon-containing external energy sources such as coke beds. The organic constituents present in standard domestic refuse are suitable to ensure that in the case of a corresponding thermal pretreatment there are adequate carbon-containing reactor charges, in which a relatively long residence time for the toxic substances made harmless in the flame temperature for the prevention of neosyntheses is ensured. This permits the one hundred percent destruction of all toxic waste components found within the most varied industrial and domestic waste materials. As a result of the regulated combustion these toxic or otherwise environmentally prejudicial waste components or molecular structures decompose into harmless end products, the process sequence being irreversible. Hydrocarbons with a high degree of chlorination and random other, halogenated molecular components decompose at the high burner temperatures of over 2000° C. and the decomposition products stabilize with a residence time of at least 5 seconds in the stabilization area, where there are temperatures of at least 1400° C. The harmless decomposition products leaving the high temperature reactor by means of the gas-permeable, lumpy reactor charge following an adequate residence time are suddenly cooled from approximately 1400° C. to preferably below 100° C., so that here again a DE-NOVO synthesis of the gas components is reliably avoided.

The toxic substances in the form of stable molecular structures from the thermal pretreatment are mixed with a combustion-accelerating and flame temperature-raising combustible gas, such as e.g. acetylene, so that the burner flame temperature is additionally increased.

The burner tip or head is a combined burner constructed in such a way that the gaseous or liquid toxic substances obtained or the toxic substance—gas mixture can be centrally introduced into the interior of the burner flame through a central opening, which is surrounded by a plurality of oxygen nozzles. The burner flame from an outer gas/oxygen nozzle ring forces all the toxic substances through the high temperature flame area before entering the stabilizing area in the form of harmlessly decomposed molecular structures, so that the necessary irreversibility of the high temperature decomposition is ensured.

I claim:

1. A process for thermally treating organic refuse which includes the simultaneous treatment and elimination of toxic substances in the refuse by irreversible decomposition into non-toxic, low molecular weight components, comprising the steps of:

a) thermally pretreating the organic refuse in a first reaction zone within a reaction vessel, b) oxidizing a portion of the carbon content of the organic refuse within the first reaction zone at a temperature of at least 2,000° C. to produce a gaseous and liquid toxic substance and a fragmentary gas-permeable organic refuse, c) separating the gaseous and liquid toxic substance from the fragmentary gas-permeable organic refuse, d) passing the gaseous and liquid toxic substance from the first reaction zone to a second reaction zone within the reaction vessel which second reaction zone contains fragmentary, gas-permeable organic refuse, e) mixing the gaseous and liquid toxic substance with a temperature-increasing combustible gas and a stoichiometrically excessive amount of oxygen in a second reaction zone within a reaction vessel, f) oxidizing the remaining carbon content of the gaseous or liquid state toxic substance, g) simultaneously oxidizing the carbon-containing fragmentary gas permeable organic refuse within the second reaction zone for a time period of at least 5 seconds at a temperature of at least 1,400° C. to produce stabilized, gaseous decomposition products, and h) suddenly cooling the decomposition products to a temperature below 100° C.

2. The process for thermally treating organic refuse according to claim 1, wherein the flame-temperature-increasing combustible gas is acetylene.

3. The process for thermally treating organic refuse according to claim 1 wherein the step of oxidizing the remaining carbon content of the gaseous or liquid toxic substance includes introducing the toxic substance and the combustible gas into a burner flame through a central opening surrounded by a plurality of oxygen sources, and forcing all of the toxic substances through the flame in connection with the production and cooling of the stabilized gas products.

* * * * *